United States Patent [19]

Koike

[11] 4,411,466

[45] Oct. 25, 1983

[54] AUTOMOBILE DOOR STRUCTURE

[75] Inventor: Shoichi Koike, Tokyo, Japan

[73] Assignee: Nissan Motor Company, Limited, Kanagawa, Japan

[21] Appl. No.: 386,271

[22] Filed: Jun. 8, 1982

Related U.S. Application Data

[63] Continuation of Ser. No. 208,387, Nov. 19, 1980, abandoned.

[30] Foreign Application Priority Data

Dec. 10, 1979 [JP] Japan ............................ 54-171368[U]

[51] Int. Cl.³ .............................................. B60J 1/00
[52] U.S. Cl. ..................................... 296/188; 49/502; 296/146
[58] Field of Search ................... 296/188, 146; 49/501, 49/502, 503

[56] References Cited

U.S. PATENT DOCUMENTS

| | | | |
|---|---|---|---|
| 3,868,141 | 2/1975 | Johnson | 296/146 |
| 3,938,288 | 2/1976 | Roubinet | 296/146 |
| 4,119,341 | 10/1978 | Cook | 296/146 |
| 4,290,641 | 9/1981 | Miyauchi | 296/146 |
| 4,369,608 | 1/1983 | Miura | 296/146 |

FOREIGN PATENT DOCUMENTS 491855  9/1938  United Kingdom .

Primary Examiner—Joseph F. Peters, Jr.
Assistant Examiner—John A. Carroll

[57] ABSTRACT

An automobile door structure comprises a door body formed with a door cavity therein, a window sash secured to the door body for guiding and retaining a windowpane, and a reinforcing member housed in the door cavity and secured at its front and rear ends to the window sash.

2 Claims, 7 Drawing Figures

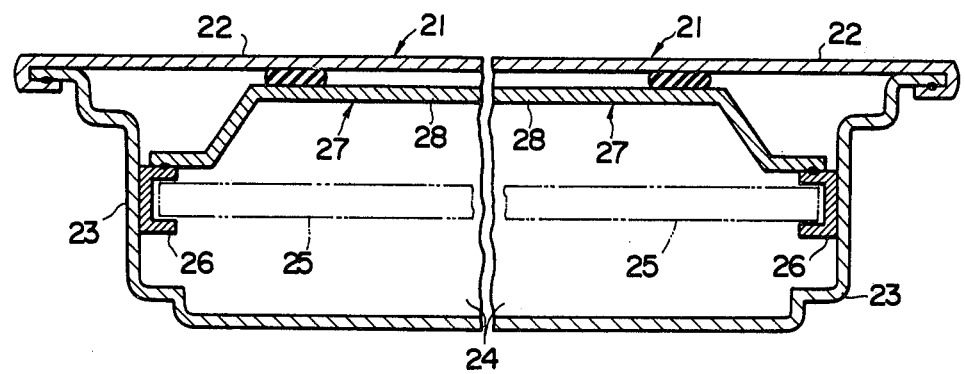
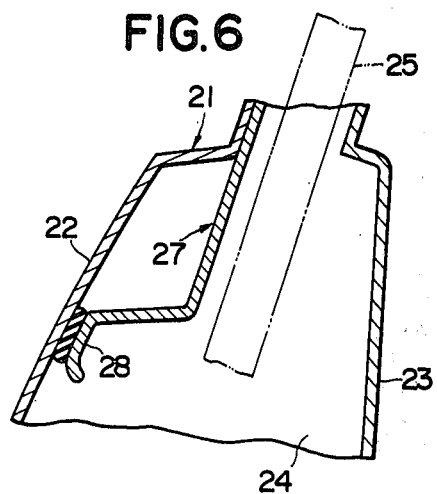
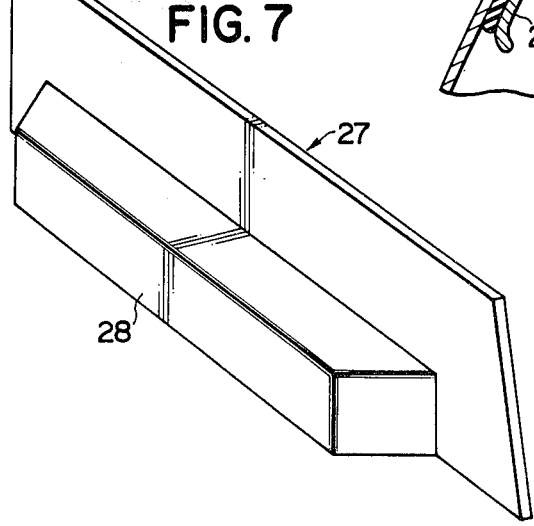

AUTOMOBILE DOOR STRUCTURE

This is a continuation of application Ser. No. 208,387, filed Nov. 19, 1980, now abandoned.

FIELD OF THE INVENTION

The present invention relates in general to a body construction of an automobile, and more particularly is concerned with a door structure of the automobile for facilitating assemblage of a window sash to a door body.

BRIEF DESCRIPTION OF THE BACKGROUND OF THE INVENTION

A conventional door structure of this nature comprises a door body, a window sash having front and rear ends respectively secured to the portions of the door body, a reinforcing member housed within and secured to the door body for reinforcing the fore-and-aft directional strength of the door body. In the above door structure, the front and rear ends of the reinforcing member are respectively in spaced apart relationship from the front and rear ends of the window sash. In general, such a window sash is made of a slender and flexible material for the purpose of guiding a windowpane and waterproofing between the windowpane and the window sash. During handling such as transferring and assemblage of the window sash, the window sash is liable to be danglingly swayed at the front and rear end portions thereof so that the door sash is ready to be bent and deformed, resulting in difficulties for accurate assemblage of the window sash to the door body. As a consequence, extra time is required for assembling the window sash to the door body, thereby deteriorating an assembling operation efficiency.

It is, accordingly, an object of the present invention to provide a door structure of an automobile which prevents the window sash from being danglingly swayed during the handling thereof.

It is another object of the present invention to provide a door structure of an automobile which is easily assembled for enhancing the assemblage operation efficiency.

SUMMARY OF THE INVENTION

In order to achieve these objects, the present invention proposes an automobile door structure comprising a door body having therein a door cavity to receive a windowpane therein, a window sash formed in a generally inverted U-shape to guide and retain the windowpane and having longitudinal front and rear ends respectively secured to the front and rear inner surfaces of the door body, and a reinforcing member housed in the door cavity to extend in a fore-and-aft direction of the door body and having a front end secured to the longitudinal front end of the window sash and a rear end secured to the longitudinal rear end of the window sash.

BRIEF DESCRIPTION OF THE DRAWINGS

The drawbacks of a prior-art automobile door structure and features and advantages of an automobile door structure according to the present invention will be more clearly understood from the following description taken in conjunction with the accompanying drawings, in which:

FIG. 5 is an enlarged fragmentary cross sectional view taken on line V—V of FIG. 4;

FIG. 6 is an enlarged fragmentary cross sectional view taken on line VI—VI of FIG. 4; and FIG. 7 is an enlarged perspective view of a reinforcing member which is an essential element of the automobile door structure of the present invention.

DESCRIPTION OF THE PRIOR ART

Figure 1:
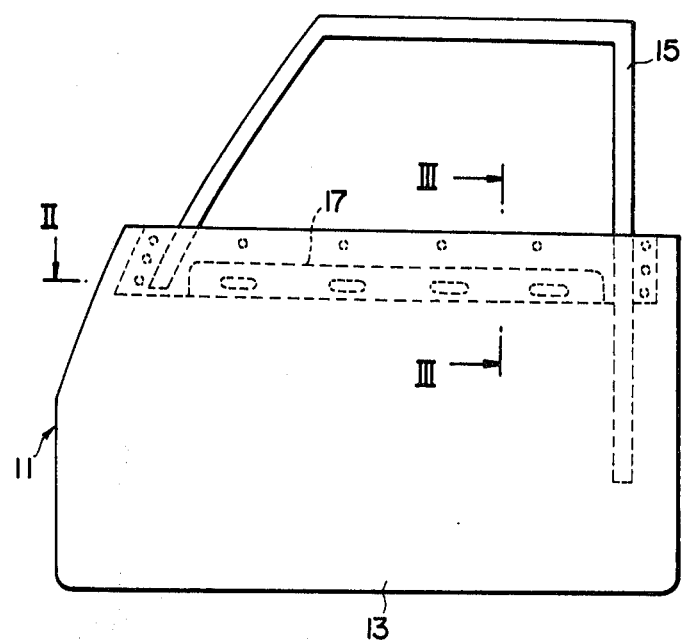
FIG. 1 is a schematic side elevational view of a prior-art automobile door structure.
Figure 2:
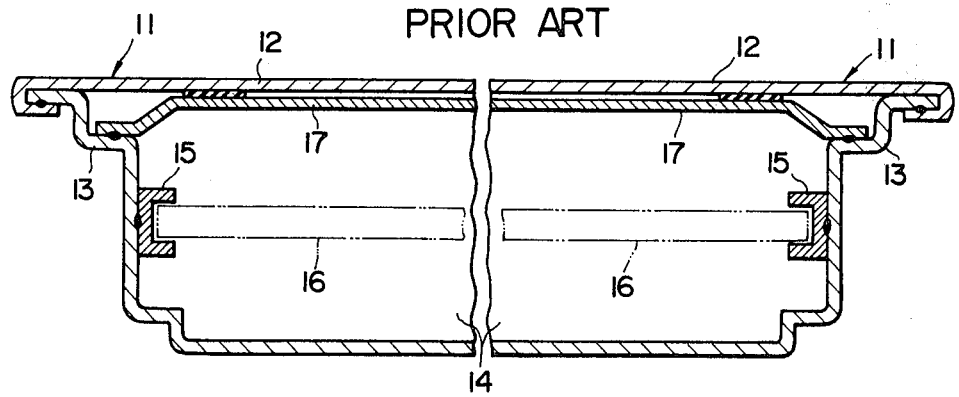
FIG. 2 is an enlarged fragmentary cross sectional view taken on line II—II of FIG. 1.
Figure 3:
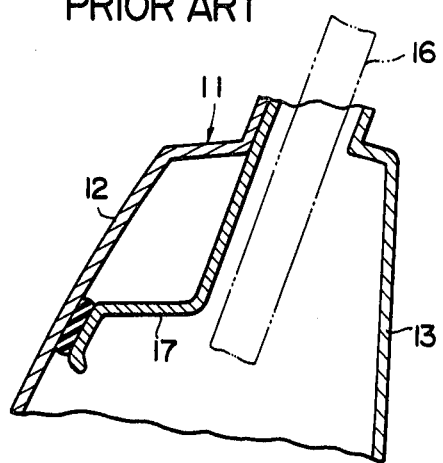
FIG. 3 is an enlarged fragmentary cross sectional view taken on line III—III of FIG. 1.
Figure 4:
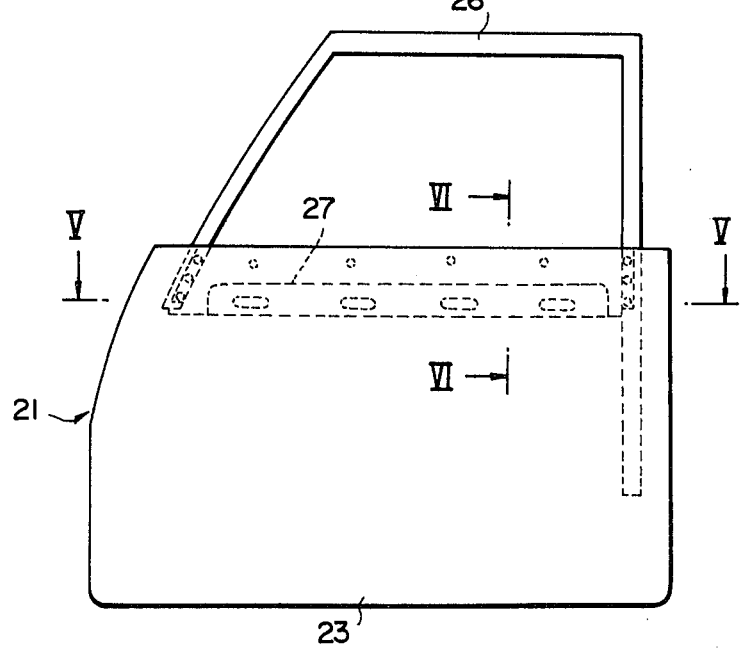
FIG. 4 is a schematic side elevational view similar to FIG. 1 but shows an automobile door structure embodying the present invention.

Referring FIGS. 1 to 3 of the drawings, a known door structure of an automobile comprises a door body 11 which has an outer panel 12 and an inner panel 13 secured to the outer panel 12 by a spot-welding to form in combination a door cavity 14. A window sash 15 is formed in a generally inverted U-shape and has front and rear end portions spot-welded to the front and rear inner surfaces of the inner panel 13 to guide and retain a windowpane 16. Housed in the door cavity 14 is a reinforcing member 17 which extends in a fore-and-aft direction of the door body 11 and which has a front end spot-welded to the front inner surface of the inner panel 13 and a rear end also spot-welded to the rear inner surface of the inner panel 13 and an outer lower portion glued to the inner surface of the outer panel 12. As will be seen particularly in FIG. 2, the front and rear ends of the reinforcing member 17 are respectively spaced apart from the front and rear ends of the window sash 15. A drawback has been encountered in the prior-art door structure of this nature in that the window sash 15 tends to be danglingly swayed at its front and rear end portions during handling such as for example transferring and assemblage thereof. Therefore, the window sash 15 is easily bent and deformed, which makes it difficult to accurately assemble the window sash 15 to the door body 11 for a shorter period of time.

DESCRIPTION OF THE EMBODIMENT OF THE INVENTION

FIGS. 4 to 7 of the drawings illustrate an embodiment of an automobile door structure which is constructed to overcome such a drawback inherent in a prior-art door structure of the type shown in FIGS. 1 to 3.

Referring to FIGS. 4 to 7, an automobile door structure embodying the present invention comprises a door body 21 which includes an outer panel 22 and an inner panel 23 forming in combination a door cavity 24 to receive a windowpane 25 therein. The outer panel 22 has turned-back end portions which are spot-welded or otherwise securely connected to the inner panel 23. A window sash 26 for guiding and retaining the windowpane 25 is formed in a generally inverted U-shape and has longitudinal front and rear ends respectively spot-welded or otherwise securely connected to the front and rear inner surfaces of the inner panel 23. A reinforcing member 27 which has a generally rectangular configuration is bent at its lower end portion 28 toward the inner surface of the outer panel 22 and is housed in the door cavity 24 to extend in a fore-and-aft direction of the door body 21. The reinforcing member 27 is secured to the outer panel 22 and the window sash 26 in such a manner that the bent lower end portion 28 of the reinforcing member 27 is secured to the outer panel 22 by a suitable adhesive material and the upper outer portion of the reinforcing member 27 is spot-welded to the outer panel 22 while the front end of the reinforcing member 27 is spot-welded or otherwise securely connected to the longitudinal front end of the window sash 26 and the rear end of the reinforcing member 27 is also spot-welded or otherwise securely connected to the longitudinal rear end of the window sash 26. Therefore, the window sash 26 can be accurately assembled to the door body 21 if the window sash 26 is securely connected to the reinforcing member 27 before the window sash 26 is asembled to the door body 21.

According to the present invention, it is possible not only to reinforce the door body in the fore-and-aft direction thereof but also to facilitate handling of the window sash. It will therefore be understood that even if the automobile comes into collision with other objects, the reinforcing member 27 can absorb impact forces caused by the collision and can prevent the doors from being seriously deformed to secure passengers' lives. In addition, the reinforcing member 27 can increase the strength of the window sash 26 so as to prevent the window sash 26 from being deformed or bent during assemblage of the door structure since the window sash 26 is secured to the reinforcing member 27 before the assemblage of the door structure. This results in enhancing assemblage accuracy of the door structure as well as assemblage operation efficiency.

Although a particular embodiment of the present invention has been shown and described, it will be obvious to those skilled in the art that various changes and modifications may be made without departing from the spirit and scope of the present invention.

What is claimed is:

1. An automobile door structure comprising:
   a door body including an outer panel and an inner panel forming in combination a door cavity to receive a windowpane therein;
   a window sash formed in a generally inverted U-shape to guide and retain said windowpane and having longitudinal front and rear ends respectively secured to the front and rear inner surfaces of said inner panel of the door body;
   a reinforcing member housed in said door cavity to extend in a fore-and aft direction of said door body and having front and rear ends respectively secured to the longitudinal front and rear ends of said window sash, said reinforcing member having portions secured to said outer panel of the door body.

2. An automobile door structure as set forth in claim 1, wherein said reinforcing member is provided with portions secured to said outer panel by an adhesive material.

* * * * *